United States Patent
Richard et al.

(10) Patent No.: US 10,837,713 B2
(45) Date of Patent: Nov. 17, 2020

(54) SYSTEM AND METHOD OF HEAT STORAGE AND RELEASE COMPRISING AT LEAST TWO CONCENTRIC HEAT STORAGE VOLUMES

(71) Applicant: IFP Energies nouvelles, Rueil-Malmaison (FR)

(72) Inventors: Florence Richard, Garches (FR); David Teixeira, Croissy sur Seine (FR); Fabrice Deleau, Pierre-Benite (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 96 days.

(21) Appl. No.: 16/302,452

(22) PCT Filed: Apr. 12, 2017

(86) PCT No.: PCT/EP2017/058874
§ 371 (c)(1),
(2) Date: Nov. 16, 2018

(87) PCT Pub. No.: WO2017/198397
PCT Pub. Date: Nov. 23, 2017

(65) Prior Publication Data
US 2019/0195570 A1    Jun. 27, 2019

(30) Foreign Application Priority Data
May 18, 2016    (FR) .................................. 16 54395

(51) Int. Cl.
*F28D 17/04*    (2006.01)
*F02C 6/16*    (2006.01)
(Continued)

(52) U.S. Cl.
CPC .............. *F28D 17/04* (2013.01); *F02C 6/16* (2013.01); *F28D 17/005* (2013.01);
(Continued)

(58) Field of Classification Search
CPC ................................. F02C 6/16; F28D 17/005
(Continued)

(56) References Cited

U.S. PATENT DOCUMENTS 3,710,857 A * 1/1973 Meyer .................. G21C 13/093
165/169
3,939,657 A * 2/1976 Postma .................... F02G 1/043
60/526
(Continued)

FOREIGN PATENT DOCUMENTS

| DE | 102008033527 A1 | 1/2010 |
| EP | 2400250 A1 | 12/2011 |
| WO | 2011/104556 A2 | 9/2011 |

OTHER PUBLICATIONS

International Search Report for PCT/EP2017/058874, dated Aug. 4, 2017; English translation submitted herewith (5 pgs.).

*Primary Examiner* — Henry T Crenshaw
(74) *Attorney, Agent, or Firm* — Fitch, Even, Tabin & Flannery LLP

(57) ABSTRACT

The present invention concerns a device and a process for the storage and restitution of heat which comprises at least two concentric heat storage volumes (TES1, TES2, TES3). The walls (2) delimiting these storage volumes are configured in a manner such that the thickness of the wall delimiting the central storage volume is greater than the thickness of the wall delimiting the peripheral storage volume.

12 Claims, 3 Drawing Sheets

(51) Int. Cl.
*F28D 20/00* (2006.01)
*F28D 17/00* (2006.01)

(52) U.S. Cl.
CPC .. *F28D 20/0056* (2013.01); *F28D 2020/0078* (2013.01); *F28D 2020/0082* (2013.01); *Y02E 60/14* (2013.01); *Y02E 60/16* (2013.01)

(58) Field of Classification Search
USPC .......................................................... 62/236
See application file for complete search history.

(56) References Cited

U.S. PATENT DOCUMENTS

| | | | |
|---|---|---|---|
| 2003/0159815 A1* | 8/2003 | Wilson | F28F 9/0275 165/157 |
| 2011/0094229 A1* | 4/2011 | Freund | F02C 6/16 60/727 |
| 2011/0100583 A1* | 5/2011 | Freund | F28D 17/02 165/10 |
| 2011/0127004 A1* | 6/2011 | Freund | F02C 7/10 165/45 |
| 2011/0200436 A1* | 8/2011 | Wu | F03D 3/005 416/170 R |
| 2011/0314812 A1 | 12/2011 | Sonwane | |
| 2012/0312496 A1 | 12/2012 | Howes et al. | |
| 2013/0056170 A1* | 3/2013 | Klemencic | F24S 60/00 165/10 |
| 2013/0186597 A1* | 7/2013 | Clark | B29C 49/06 165/104.19 |
| 2015/0114590 A1* | 4/2015 | Brunhuber | F28D 17/005 165/10 |
| 2018/0106165 A1* | 4/2018 | Barmeier | F01K 3/18 |

\* cited by examiner

SYSTEM AND METHOD OF HEAT STORAGE AND RELEASE COMPRISING AT LEAST TWO CONCENTRIC HEAT STORAGE VOLUMES

CROSS REFERENCE TO RELATED APPLICATIONS

Reference is made to PCT/EP2017/058874 filed Apr. 12, 2017, and French Application No. 16/54.395 filed May 18, 2016, which are incorporated herein by reference in their entirety.

BACKGROUND OF THE INVENTION

Field of the Invention

The present invention relates to the field of heat storage and restitution, in particular for storing heat in a system or process of the AA-CAES type ("Advanced Adiabatic—Compressed Air Energy Storage").

Description of the Prior Art

In a compressed air energy storage system (CAES), the energy which is to be used at another time is stored in the form of compressed air. For storage, energy, in particular electrical energy, drives air compressors, and to draw on the energy, the compressed air drives turbines which can be connected to a generator of electricity. The yield from this solution is not optimal, because part of the energy from the compressed air is in the form of heat which is not used. In fact, in CAES processes, only mechanical energy from the air is used, that is all of the heat produced during compression is dumped. By way of example, air compressed to 8 MPa (80 bar) heats up during compression to about 150° C., but it is cooled before storage. In addition, the yield from a CAES system is not optimal because subsequently, the system has to heat the stored air in order to expand the air. In fact, if the air is stored at 8 MPa (80 bar) and at ambient temperature and if the energy is to be recovered by expansion, decompression of the air again follows an isoentropic curve, but this time starting from the initial storage conditions (approximately 8 MPa and 300K, i.e. approximately 27° C.). Thus, the air cools to unrealistic temperatures (83K, i.e. −191° C.). It therefore has to be reheated, which can be carried out using a burner employing gas or other fuel.

A number of variations of this CAES system currently exist. In particular, the following systems and processes may be mentioned:
  ACAES ("Adiabatic Compressed Air Energy Storage"), in which the air is stored at high temperature due to the compression. However, that type of system requires specific, bulky and expensive storage means (adiabatic storage).
  AACAES ("Advanced Adiabatic Compressed Air Energy Storage"), in which the air is stored at ambient temperature and the heat due to compression is also stored, separately, in a heat storage system, TES ("Thermal Energy Storage"). The heat stored in the TES is used to heat the air before it is expanded. In some designs, the heat is stored in the storage system using solid particles.

In addition, heat exchange systems of this type are used in other fields: the storage of solar energy, sea energy, in metallurgical processes, etc.

One of the design criteria for heat exchange, storage and restitution devices is their resistance to the high pressures and high temperatures of the fluids that exchange the heat. This resistance to high pressures and high temperatures is generally achieved by making the elements of the structure of these heat exchange and storage systems very thick, which means that the mass is great and the price is high.

In addition, when it is necessary to store heat from the fluids at specific temperatures and/or pressures, it is necessary to have at least two heat storage systems TES, which makes the system bulky (large footprint required).

In order to overcome these disadvantages, US published patent application 2011/0127004 A1 proposes several solutions to the design of a heat storage system. One of the envisaged solutions produces a heat storage system with two concentric heat storage volumes. That design is not optimal in terms of the thicknesses of the walls delimiting the volumes; in fact, the outer wall is subjected to a large pressure difference, which means that using a thick outer wall is obligatory. In addition, adapting that solution to high pressures of more than 100 bar also necessitates increasing the thicknesses of the walls, which means that the mass is great and the price is high.

SUMMARY OF THE INVENTION

The present invention concerns a device for the storage and restitution of heat which comprises at least two concentric heat storage volumes. The walls delimiting these storage volumes are configured in a manner such that the thickness of the wall delimiting the central storage volume is greater than the thickness of the wall delimiting the peripheral storage volume. Thus, it is possible to store the heat obtained from a fluid at a high pressure in the central volume, and the heat obtained from a fluid at a lower pressure in the peripheral volume. In this manner, the pressure difference to which each wall is exposed is reduced. This design also means that the device can be used at high pressures, while optimizing the mass and cost of the heat storage and recovery device.

The Device and the Process Accordance with the Invention

The invention concerns a device for the storage and restitution of heat, comprising at least two heat storage volumes delimited by concentric walls, the heat storage volumes comprising a heat storage material. The thicknesses of the concentric walls delimiting the heat storage volumes decrease from the wall delimiting the central heat storage volume towards the wall delimiting the peripheral heat storage volume.

In accordance with one embodiment of the invention, the device for the storage and restitution of heat comprises at least three concentric heat storage volumes.

Advantageously, the walls are produced from metal, in particular from steel.

In accordance with one embodiment, the walls are formed by assembling at least one single-layered or multi-layered sheet metal coil, in particular by assembly using welding.

Advantageously, the walls are reinforced with at least one circumferential ring.

In accordance with a variation, the wall delimiting the heat storage volume located at the periphery of the device for the storage and restitution of heat is covered with an insulating material.

In accordance with one embodiment, the heat storage material is formed by concrete beads.

In accordance with one characteristic, the device for the storage and restitution of heat comprises at least one of a bar and a reinforcing plate disposed between the walls.

In accordance with an embodiment option, each heat storage volume is formed by a plurality of modules associated in series and/or in parallel.

In addition, the invention concerns a process for the storage and restitution of heat using a device for the storage and restitution of heat in accordance with one of the preceding characteristics, in which the following steps are carried out:
 a) a fluid at a first pressure P1 is moved in a first heat storage volume of the device for the storage and restitution of heat; and
 b) the fluid at a second pressure P2 is moved in a second heat storage volume of the device for the storage and restitution of heat, the second pressure P2 being higher than the first pressure P1 and the second heat storage volume being located in the interior of the first heat storage volume.

In accordance with one embodiment, step b) is repeated in a manner causing the fluid to move consecutively in each heat storage volume of the device for the storage and restitution of heat.

Furthermore, the invention concerns a system for the storage and recovery of energy using compressed gas, comprising at least two systems for the compression of the gas, at least one compressed gas storage, at least two systems for the expansion of the compressed gas in order to generate energy. The system for the storage and recovery of energy comprises a device for the storage and restitution of heat in accordance with one of the preceding characteristics, a first heat storage volume of the device for the storage and restitution of heat being capable of cooling the compressed gas between at least one of the gas compression system and being capable of heating the gas between the gas expansion system, and a second heat storage volume of the device for the storage and restitution of heat in the interior of the first heat storage volume, being capable of cooling the compressed gas between a gas compression system and at least one of the compressed gas storage systems and being capable of heating the compressed gas between compressed gas storage system and a first gas expansion system.

Advantageously, the system for the storage and recovery of energy using compressed gas comprises at least three gas compression system and at least three gas expansion system, and the device for the storage and restitution of heat comprises at least three heat storage volumes.

The invention also concerns a process for the storage and recovery of energy using compressed gas. The process comprises the following steps using a system for the storage and recovery of energy having one of the preceding characteristics:
 a) a gas is compressed;
 b) the compressed gas is cooled in a first heat storage volume of the device for the storage and restitution of heat;
 c) the cooled gas is compressed;
 d) the compressed gas is cooled in a second heat storage volume of the device for the storage and restitution of heat, the second heat storage volume being located in the interior of the first heat storage volume;
 e) the cooled gas is stored;
 f) the stored gas is heated in the second heat storage volume;
 g) the heated gas is expanded in order to generate energy;
 h) the expanded gas is heated in the first heat storage volume; and
 i) the heated gas is expanded.

In accordance with one embodiment, steps c) and d) and/or h) and i) are repeated for each of at least one gas compression system and for each gas expansion system.

BRIEF DESCRIPTION OF THE DRAWINGS

Other characteristics and advantages of the device and the process in accordance with the invention will become apparent from the following description of non-limiting examples of embodiments, made with reference to the accompanying drawings and described hereinbelow.

DETAILED DESCRIPTION OF THE INVENTION

Figures 1A, 1B:
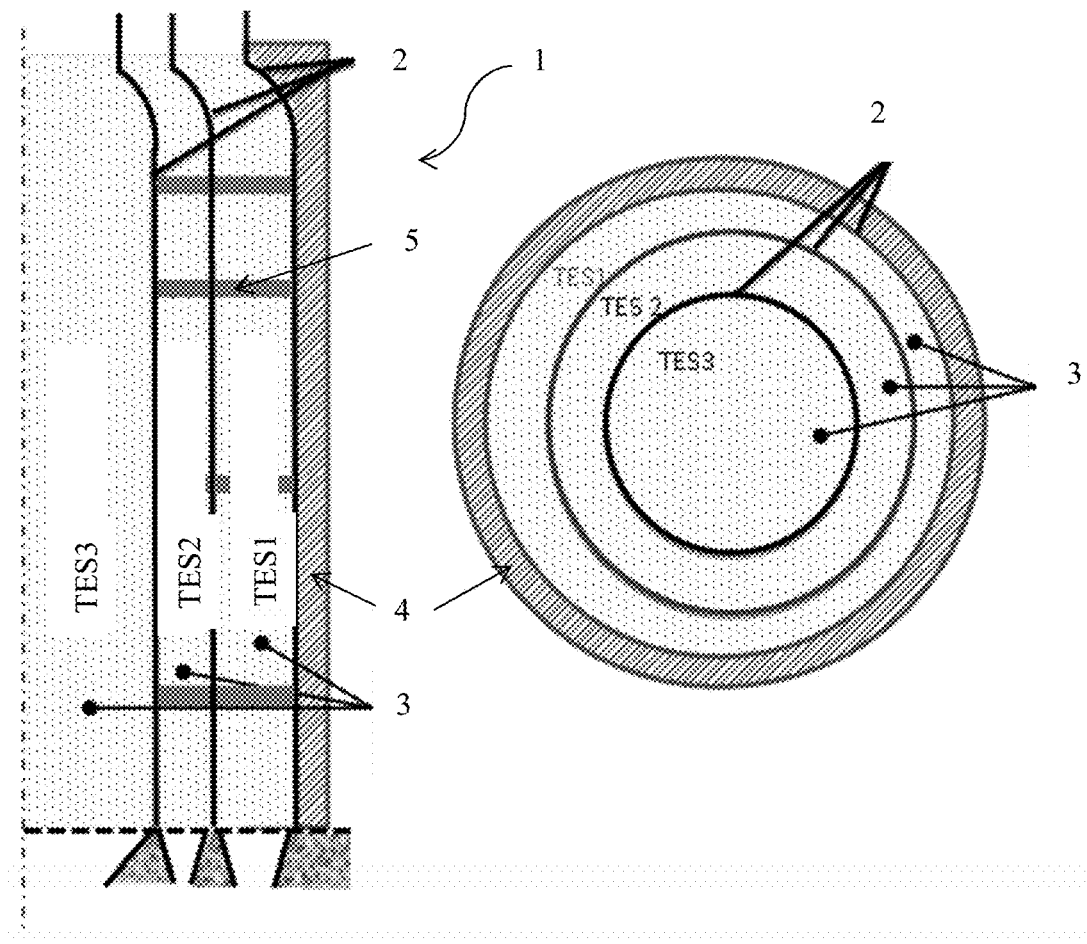
FIGS. 1a and 1b illustrate a sectional view of a device for the storage and restitution of heat in accordance with one embodiment of the invention.

The present invention concerns a device for the storage and restitution of heat, which will be termed a "heat storage device" in the remainder of the description. The function of the heat storage device is to store heat obtained from a hot fluid, and to restore this heat to a cold fluid. The device for the storage and restitution of heat in accordance with the invention comprises at least two heat storage volumes delimited by concentric walls. Thus, the heat storage device comprises at least one substantially cylindrical storage volume, also termed the central volume, and at least one annular storage volume, disposed around the cylindrical storage volume. A first wall is disposed around the cylindrical heat storage volume, and thus delimits the central heat storage volume. A second wall is disposed around the annular volume. Thus, the annular volume is delimited by the first and second walls. The heat storage volume delimited by the outermost wall is termed the peripheral heat storage volume. In other words, the peripheral volume is the heat storage volume which is the furthest to the outside and is not surrounded by any other heat storage volumes (in contrast to the other storage volumes which are surrounded by at least one other storage volume). Preferably, the walls have a substantially cylindrical shape and are preferably vertical.

Each heat storage volume comprises a heat storage material. A heat storage material is a material that is capable of exchanging heat with a fluid. It is capable of cooling a hot fluid, by storing the heat, and is capable of heating a cold fluid to restore heat to it. The heat storage material may be of any type, for example in the form of discrete elements, in particular in the form of beads. The beads may have a diameter in the range 1 to 50 mm. The material may be a phase change material (PCM), or a concrete, or any analogous material. In accordance with one example embodiment which is adapted to the use of the heat storage device for an AACAES type system, the heat storage material may comprise concrete beads with a diameter of more than 10 mm. This storage material has the advantage that, during the course of temperature changes, variations in the diameter of the various components do not cause any problems.

In accordance with the invention, the thicknesses of the consecutive walls delimiting the heat storage volumes decrease (not strictly, that is they decrease or are equal) from the wall delimiting the central heat storage volume towards the wall of the peripheral heat storage volume. In other words, the wall delimiting the central volume has a thickness $e1$, which is greater than or equal to a thickness $e2$ of the wall delimiting a first annular volume surrounding the central volume, which itself is greater than or equal to the thickness $e3$ of the wall delimiting a second annular volume surrounding the first annular volume, and so on. If the heat storage device comprises N separate heat storage volumes separated by N walls with respective thicknesses $ei$ (i varying from 1 to N, where 1 corresponds to the wall of the central volume and N corresponds to the wall of the peripheral volume), the following inequality can be written: $eN \leq eN-1 \leq \ldots \leq e3 \leq e2 \leq e1$, with at least one of these inequalities being a strict inequality. Because of this design, the central heat storage volume is capable of receiving a fluid at a pressure that is higher than in the annular heat storage volumes, and the peripheral storage volume is capable of receiving a fluid at a pressure that is lower than in the other heat storage volumes. Thus, this configuration can be used to limit the pressure difference at each wall. In fact, since the wall of the central heat storage volume (intended to receive the highest pressures) is subjected to a lower pressure difference, this central wall does not need to be as thick as when the pressure difference is high.

The various embodiments described below may be combined in order to combine their effects.

Preferably, the heat storage device comprises at least three concentric heat storage volumes (and thus at least three walls). Preferably, the heat storage device comprises three or four heat storage volumes (and thus three or four walls). This configuration is particularly suitable for AACAES type systems which generally comprise three or four compression stages. In fact, this means that smaller pressure variations between two consecutive TESs can be obtained, which substantially reduces the thickness of the walls. In addition, this configuration is particularly suitable for high pressures, thereby limiting the mass and the cost of the heat storage device.

The walls of the heat storage device are intended to take up the weight of the heat storage material and the difference in pressure. In addition, for some applications of the heat storage device, the walls may be subjected to temperatures of the order of 300° C.

In accordance with one design of the invention, the walls may be formed from metal, in particular from steel, in order to meet the criteria. Alternatively, other materials may be envisaged.

The metal walls may be obtained by assembly, for example by welding, of a sheet metal coil. The wall may be single-layered (with a single thickness). Alternatively, the wall may be obtained by assembly, for example by welding, of multi-layered sheet metal coil. This multi-layered embodiment means that discrete sheet metal thicknesses can be obtained which are thinner than a single-layered metal sheet, which facilitates working. A variation of this multi-layer embodiment may be obtained by assembling pre-tensioned upper layers in order to produce a multi-layer wall by friction fitting over the outer layers, which means that the quantity of material necessary for producing the walls can be optimized.

In accordance with one embodiment, the wall may be reinforced, for example with at least one circumferential ring, which means that a thinner wall can be produced and reinforcements can readily be added in order to resist stresses due to fluid pressure. The circumferential ring may preferably be formed from metal, in particular from steel. The wall may be reinforced with a number of circumferential rings which is in the range six to twenty, preferably in the range ten to fifteen.

In accordance with one configuration, all of the walls may be produced in the same manner, and only their thickness will vary. Alternatively, the walls may be of different types (single-layered, multi-layered, with or without reinforcement, etc).

In accordance with one embodiment of the invention, the wall delimiting the peripheral heat storage volume is covered with an insulating material. Thus, it is possible to maintain the temperature inside the heat storage device, which assists heat storage. The insulating layer may be arranged outside and/or inside the wall delimiting the peripheral storage volume. The insulating layer cannot take up the various forces, and so the insulating layer does not form part of the wall: the thickness of the insulating layer should not be taken into account in the thickness of the wall of the peripheral volume.

Because the heat storage volumes are arranged concentrically, it is possible to use a smaller quantity of insulating material compared with prior art systems. In fact, the internal storage volumes (those closest to the center) are insulated by those with a larger diameter; only the wall of the peripheral heat storage volume has to be insulated, in contrast to conventional heat storage devices.

In accordance with one embodiment of the invention, the heat storage device may comprise at least one of a reinforcing bar and at least one reinforcing plate with the reinforcing plate possibly being perforated. At least one of the reinforcing bar and the plate is disposed between the walls, substantially orthogonally to the walls, in a manner to mutually maintain the positioning of the walls in the annular parts.

In addition, the heat storage device may comprise at least one grid, disposed between the walls with this grid being able to support the weight of the heat storage material.

In accordance with one embodiment, the heat storage device may be designed in the form of several modules in at least one of series and parallel in order to facilitate its installation and its transport by thereby providing elements with reduced sizes and weights. These various elements may be at slightly different pressures varying, for example, from 70 to 120 bar, so as to be adapted to the operation of the heat storage device which might not have the same pressure over the whole of its height.

In accordance with one embodiment, an intermediate level may be produced in order to produce an interesting pressure difference in the central volume, without generating a supplemental reservoir used as a heat storage volume. This may have a small annular gap which is just sufficient to apply pressure. As an example, for this embodiment, a concentric volume may be provided which is without heat storage material.

Preferably, the heat storage device is constructed in a manner such that the temperature gradient in the various volumes is substantially identical.

FIGS. 1a and 1b illustrate a heat storage device in accordance with one embodiment of the invention in a diagrammatic and non-limiting manner, FIG. 1a is a vertical half-sectional view of a heat storage device. FIG. 1b is a horizontal sectional view of the same heat storage device. The heat storage device 1 comprises three heat storage volumes TES1, TES2, and TES3. These heat storage volumes TES1, TES2, and TES3 are delimited by vertical cylindrical walls 2. In this figure, the thicknesses of the walls 2 are represented in an identical manner. However the thickness of the central wall is greater than the thickness of the intermediate wall, which itself is greater than the thickness of the peripheral wall. The heat storage volumes TES1, TES2, and TES3 comprise a heat storage material 3, for example concrete beads. The heat storage device also comprises an insulating layer 4 covering the exterior surface of the peripheral wall 2. In addition, the heat storage device comprises reinforcing bars 5 for supporting the walls 2, These reinforcing bars 5 are disposed between the various walls 2.

The heat storage device of FIGS. 1a and 1b may be modified by changing the number of heat storage volumes (and thus the number of walls) which may, for example be four, by adding or removing reinforcing bars 5, moving the insulating layer 4 to the interior of the peripheral wall 2 thereby, etc.

Figure 2:
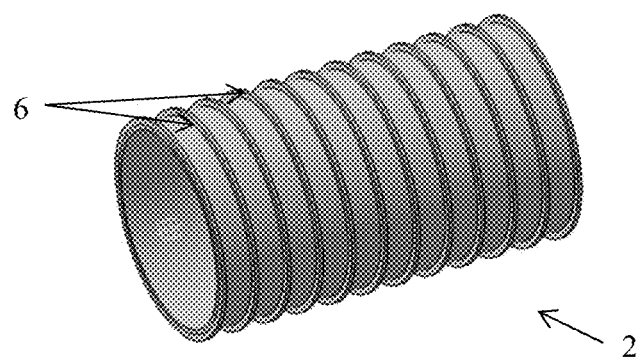
FIG. 2 illustrates a wall reinforced with circumferential rings in accordance with one embodiment of the invention.

FIG. 2 represents a wall in accordance with an embodiment of the invention, in a diagrammatic and non-limiting manner. The wall 2 is cylindrical in shape. It may be produced from metal, in particular from steel. The wall 2 comprises a plurality of circumferential reinforcing rings 6, twelve in the example of FIG. 2. The circumferential rings 6 may be produced from metal, in particular from steel.

In addition, the present invention concerns a process for the storage and restitution of heat using a heat storage device. For this process, a fluid is moved in each heat storage volume, by moving the fluid at the highest pressure in the central heat storage volume, and the fluid with the lowest pressure in the peripheral heat storage volume. The pressure of the fluid decreases from the center of the heat storage device towards the periphery of the heat storage device. In other words, for this process, the following steps may be carried out:
  a) a fluid at a first pressure P1 is moved in a first heat storage volume of the device for the storage and restitution of heat;
  b) the fluid at a second pressure P2 is moved in a second heat storage volume of the device for the storage and restitution of heat, the second pressure P2 being higher than the first pressure P1 and the second heat storage volume being located in the interior of the first heat storage volume: and
  c) optionally, step b) for each heat storage volume are repeated by moving a fluid in the heat storage volume located in the interior of the preceding volume, the fluid having a pressure which is higher than the preceding pressure.

These steps a), b) and c) may be carried out successively or simultaneously.

Furthermore, the present invention concerns a system for the storage and recovery of energy using compressed gas equipped with a heat storage system (for example of the AACAES type). In this implementation, the gas under pressure (usually air) is stored cold. The energy storage and recovery system in accordance with the invention comprises:
  at least two staged gas compression means (or compressors). Each gas compressor means may be driven by a motor, in particular an electric motor;
  at least one means (also known as a reservoir) for storing gas compressed by the gas compressor. The compressed gas storage may or may not be a natural reservoir (for example an underground cavern). The compressed gas storage means may be on the surface or underground. In addition, it may be formed by a single volume or by a plurality of volumes which may or may not be connected;
  at least two stages of gas expansion (also termed a reducer or turbine), which can be used to expand the compressed and stored gas. Each stage of gas expansion can be used to generate energy, in particular electrical energy using a generator;
  at least one heat storage and restitution device, in order to store heat obtained from compressed gas during the energy storage phase, and allowing restitution of the heat stored in the compressed gas during the energy restitution phase with the heat storage and restitution system being preferably placed at the outlet from the compressor and at the inlet to the gas expansion system.

In accordance with the invention, the heat storage and restitution device is in accordance with any one of the combinations of the embodiments described above and comprises at least two concentric heat storage volumes. A first heat storage volume of the heat storage and restitution device is capable of cooling the compressed gas between at least one of the gas compressor and is capable of heating the gas between the gas expansion system, and a second heat storage volume of the heat storage and restitution device, which is in the interior of the first heat storage volume, is capable of cooling the compressed gas between a gas compression and the storage for storing at least one of the compressed gas and is capable of heating the compressed gas between the compressed gas storage and a first gas expansion system.

This configuration allows the thickness of the walls of the heat storage device to be reduced compared with the prior art, by reducing the pressure difference between the interior and the exterior of the walls delimiting the heat storage volumes. In addition, this configuration can be used to save space on the ground by condensing the heat storage device. Furthermore, by using a heat storage device which can produce smaller pressure differences, it is possible to use smaller diameters, which means that the height of the heat storage device can be limited.

The terms "staged compression" (or respectively "staged expansion") are used when a plurality of compression means (respectively expansion means) are mounted in succession one after the other in series. The compressed gas (respectively expanded gas) leaving the first compression means (respectively expansion means) then passes into a second compression means (respectively expansion means), and so on. Thus, the term "compression stage" or "expansion stage" is used for a compression or expansion of the plurality of staged compression or expansion means or systems. Advantageously, when the system comprises a plurality of compression and/or expansion stages, an exchange of heat (brought about by the heat storage device) is carried out between each compression and/or expansion stage. Thus, the compressed gas is cooled between each compression, which results in the yield for the subsequent compression to be optimized, and the expanded gas is heated between each expansion, which means that the yield for the subsequent expansion can be optimized. The number of compression stages and the number of expansion stages may be in the range two to ten, preferably in the range three to five. Preferably, the number of compression stages is identical to the number of expansion stages and to the number of heat storage volumes of the heat storage device. A preferred configuration for the system for the storage and recovery of energy using compressed gas comprises three or four compression stages, the same number of expansion stages and the same number of heat storage volumes. This configuration also provides a good compromise between the energy recovered and the mass and cost of the heat storage device (reduced wall thicknesses).

In accordance with a variation of the invention, the compression systems may be reversible which means they could function both for compression and for expansion. It is therefore possible to limit the number of devices used in the system in accordance with the invention, which leads to savings of weight and volume of the system in accordance with the invention.

The system in accordance with the invention is adapted to any type of gas, in particular for air. In this case, the incoming air used for compression may be taken from the ambient air, and the outgoing air following expansion may be released into the ambient air. In the remainder of the description, only the variation using compressed air and its AACAES application will be described. However, the system and the compressed gas energy storage process are applicable to any other gas.

Figure 3:
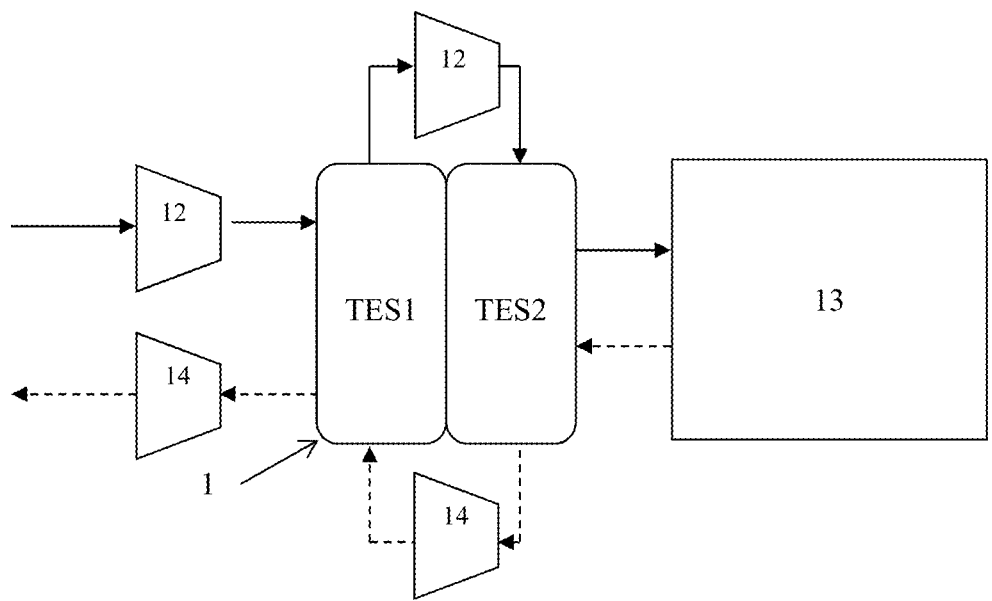
FIG. 3 diagrammatically illustrates a system for the storage and recovery of energy using compressed gas in accordance with an embodiment of the invention, FIG. 4 diagrammatically illustrates a system for the storage and recovery of energy using compressed gas in accordance with another embodiment of the invention.

FIG. 3 illustrates a non-limiting example of an AACAES system in accordance with the invention. In this figure, the unbroken-lined arrows illustrate the movement of the gas during the compression steps (energy storage), and the broken-lined arrows illustrate the movement of gas during the expansion steps (restitution of energy). This figure illustrates an AACAES system comprising two compression stages 12, two expansion stages 14 which are gas expanders and a heat storage and restitution device 1 comprising two heat storage volumes TES1 and TES2. In this figure (for the purpose of simplification), the two heat storage volumes TES1 and TES2 are represented side by side, but the heat storage volume TES2 is disposed within the heat storage volume TES1. In addition, the positioning of the various elements of the AACAES system is purely illustrative. The system comprises a compressed gas storage reservoir 13. The first heat storage volume TES1 is interposed between the two compression stages 12 and between the two expansion stages 14 which are gas expanders. The second heat storage volume TES2 of the heat storage and restitution device 1 is interposed between the compression/expansion stage 12 or 14 and the compressed gas storage reservoir 13. Conventionally, in the energy storage phase (compression), air is initially compressed in a first compressor 12, then cooled in the heat storage volume TES1. The cooled air is then compressed a second time by a second compression stage 12. The compressed gas is cooled a second time in the second heat storage volume TES2. The compressed and cooled gas is stored in the reservoir 13. The heat storage material of the heat storage system 1 is hot following cooling of the compressed gas in the compression phase. During energy recovery (expansion), the stored compressed gas is initially heated in the second heat storage volume TES2. Next, in a conventional manner, the gas passes through an expansion stage 14. The expanded gas is heated a second time in the first heat storage volume TES1. At the outlet from this first heat storage volume TES1, the gas passes through a second expansion stage 14 which are gas expanders.

Figure 4:
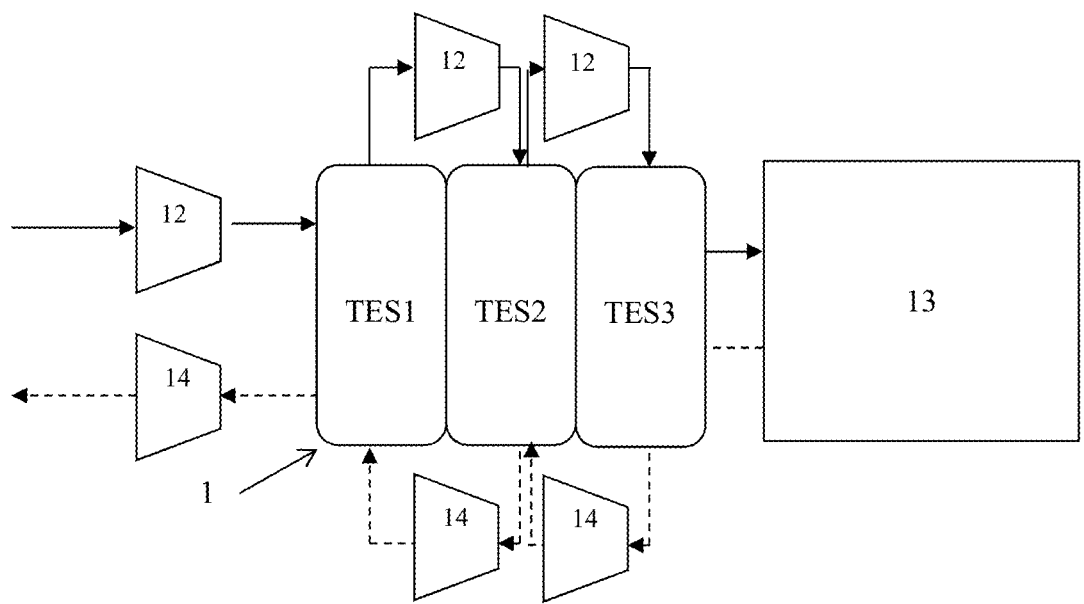

FIG. 4 illustrates a second non-limiting exemplary embodiment of an AACAES system in accordance with the invention. In this figure, the unbroken-lined arrows illustrate the movement of gas during the compression steps (energy storage) and the broken-lined arrows illustrate the movement of gas during the expansion stages (restitution of energy). This figure illustrates an AACAES system comprising three compression stages 12, three expansion stages 14 and one heat storage and restitution device 1 comprising three heat storage volumes TES1, TES2 and TES3. In this figure (for the purposes of simplification), the three heat storage volumes TES1, TES2 and TES3 are represented side by side, but the heat storage volume TES3 is disposed within the heat storage volume TES2, which is itself disposed within the heat storage volume TES1; in addition; the positioning of the various elements of the AACAES system is purely illustrative. The system comprises a compressed gas storage reservoir 13. The first and the second heat storage volumes TES1 and TES2 are interposed between two compression stages 12 and between two expansion stages 14 which are gas expanders. The third heat storage volume TES3 of the heat storage and restitution device 1 is interposed between the compression/expansion stage 12 or 14 and the compressed gas storage reservoir 13. In a conventional manner, in the energy storage phase (compression), air is initially compressed in a first compression stage 12, then cooled in the heat storage volume TES1. The cooled air is then compressed a second time by a second compression stage 12. The compressed gas is cooled a second time in the second heat storage volume TES1 The cooled air is then compressed a third time in a third compression stage 12. The compressed gas is cooled a third time in the third heat storage volume TES3. The compressed and cooled gas is stored in the reservoir 13. The heat storage material of the heat storage system 1 is hot following cooling of the compressed gas in the compression phase. During energy recovery (expansion), the stored compressed gas is initially heated in the third heat storage volume TES3. Next, the gas passes through an expansion stage 14. The expanded gas is heated a second time in the second heat storage volume TES2. Next, in a conventional manner, the gas passes through an expansion stage 14. The expanded gas is heated a third time in the first heat storage volume TES1. At the outlet from this first heat storage volume TES1, the gas passes through a third expansion stage 14.

The system for the storage and recovery of energy using compressed gas in accordance with the invention is not limited to the examples in FIG. 3 or 4. Other configurations may be envisaged: a different number of compression and/or expansion stages, the use of reversible systems to carry out compression and expansion, etc.

Alternatively, the heat storage and recovery system in accordance with the invention may be used for any type of use necessitating the storage of heat, in particular for the storage of solar energy, wind energy, or for any type of industry, for example metallurgy, etc.

The present invention also concerns a process for the storage and recovery of energy using compressed gas, in which the following steps are carried out:
a) a gas is compressed, in particular by means of a compressor;
b) the compressed gas is cooled by heat exchange in a first heat storage volume of the device for the storage and restitution of heat in accordance with the invention;
c) the cooled gas is compressed, in particular by means of a second compressor;
d) the compressed gas is cooled by heat exchange in a second heat storage volume of the device for the storage and restitution of heat, the second heat storage volume being located in the interior of the first heat storage volume;

e) the cooled compressed gas is stored, in particular by means of a compressed gas storage means;
f) the stored compressed gas is heated; by heat exchange, in the second heat storage volume of the device for the storage and restitution of heat in accordance with the invention;
g) the compressed heated gas is expanded in order to generate energy, for example by use of a turbine in order to generate electrical energy;
h) the expanded compressed gas is heated, by heat exchange, in the first heat storage volume of the device for the storage and restitution of heat; and
i) the heated compressed gas is expanded in order to generate energy, for example by use of a turbine in order to generate electrical energy.

In accordance with one embodiment of the invention, steps c) and d) and/or h) and i) are repeated for each compression and/or expansion stage.

The process for the storage and recovery of energy using compressed gas may be carried out with one of the variations of the device for the storage and restitution of heat described above, or any one of the combinations of the variations described above.

Step a) concerns the compression of a gas, for example air. In particular, this may be air removed from the ambient medium.

Steps b) and d) can be used to cool the compressed gas after each compression step, which results in the yield for the following compression and/or energy storage step being optimized. During storage of compressed gas (compression), the heat storage device can be used to recover the maximum amount of heat obtained from compression of the gas at the outlet from the compressors and to reduce the temperature of the gas before it passes into the next compression or before storage of the compressed gas. As an example, the temperature of the compressed gas could fall from more than 150° C., for example approximately 190° C., to a temperature of less than 80° C., for example approximately 50° C.

Step e) may be carried out inside a compressed gas storage, which may or may not be a natural reservoir (for example an underground cavern). The compressed gas storage means may be at the surface or underground. In addition, it may be formed by a single volume or by a plurality of volumes which may or may not be interconnected. During storage, the compressed gas storage is closed.

The compressed gas is stored until the time the stored energy is to be recovered. Step f) and the subsequent steps are carried out at the time when the stored energy is to be recovered.

Steps f) and h) can be used to heat the compressed air before each expansion, which results in the yield for the subsequent expansion being optimized. The heat storage device can be used, during energy restitution, to restore a maximum amount of the stored heat by increasing the temperature of the gas before it passes into the subsequent expansion. As an example, the temperature of the gas may rise from a temperature of less than 80° C., for example approximately 50° C., to a temperature of more than 150° C., for example approximately 180° C.

During steps g) and i), the compressed gas is expanded. Expansion of a compressed gas can be used to generate energy. This expansion may be carried out using a turbine which generates electrical energy. If the gas is air, the expanded air can be evacuated to the ambient medium.

The process and the system for the storage and recovery of energy using compressed gas in accordance with the invention may be used for the storage of intermittent energy, such as wind or solar energy, in order to be able to use that energy at the desired point in time.

Illustrative Example

A (non-limiting) exemplary embodiment of a heat storage device having four heat storage volumes is described, using dimensions issued by the oil industry which are less conservative than CODAP (code governing the construction of pressure vessels not subjected to the action of a flame):
  a steel wall with an internal diameter of 3.5 m and a thickness of the order of 100 mm constituted the central heat storage volume (denoted TES4) which was at the highest pressure of 125.6 bar.
  a second steel wall with an internal diameter of 5.8 m and a thickness of the order of 70 mm, corresponding to a first annular heat storage volume with an internal pressure of 62.5 bar (denoted TES3).
  a third steel wall with an internal diameter of 6.28 m and a thickness of the order of 60 mm, corresponding to a second annular heat storage volume with an internal pressure of 30.8 bar (denoted TES2).
  the last steel wall with an internal diameter of 7.29 m and a thickness of the order of 14 mm, corresponding to the peripheral heat storage volume (denoted TES1).
  an insulating layer which covers the last steel wall.

Each heat storage volume contains a storage material with an internal volume of 478.5 m³ in the form of a cylinder for the central heat storage volume and an annulus for the subsequent heat storage volumes. This assembly could contain 574 tonnes of storage material. In order to have the necessary volume, a height of close to 50 m was required. This could be accomplished using three modules approximately 17 m in height installed in series.

A different quantity of steel was required in order to produce each interlinked heat storage volume. The values for each TES are given in Table 1:

TABLE 1

Masses of steel for the heat storage device design example

|  | TES 1 | TES 2 | TES 3 | TES 4 |
| --- | --- | --- | --- | --- |
| Mass of steel (tonnes) | 125 | 474 | 404 | 405 |

For on-site installation, the various steel cylinders could be divided into various elements that can be transported by truck, then routed to the site for assembly and welding. For TES4, which is subjected to the highest pressure and consequent thickness, particular attention had to be paid to the welds. As assembly progressed, the storage material could be added and the support bars could be installed.

Figure 5:
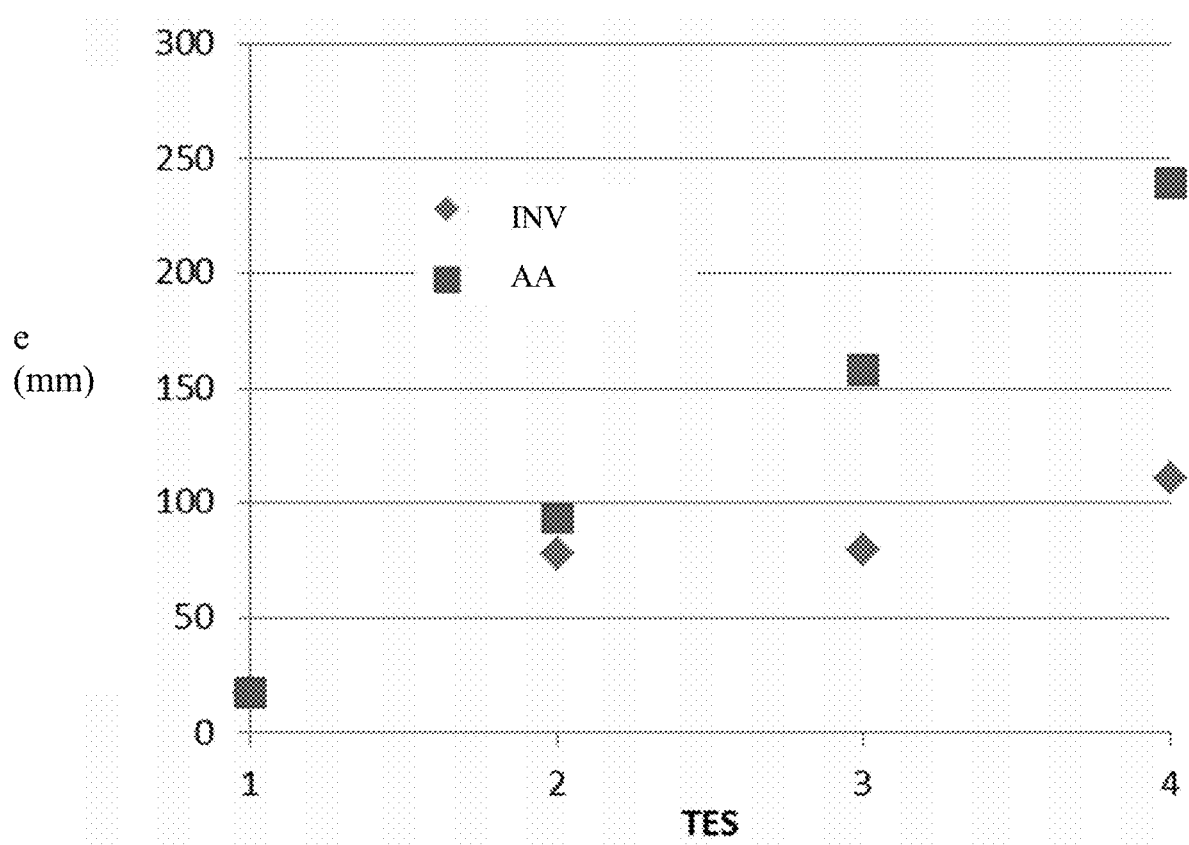
FIG. 5 is a graph illustrating a comparison between the diameters of the walls of a device for the storage and restitution of heat in accordance with the invention and in accordance with the prior art.

In accordance with a second example, in order to demonstrate the importance of the system in accordance with the invention, particularly in terms of the thickness of the steel used, a heat storage device in accordance with the invention, INV, with four concentric heat storage volumes, was compared with a heat storage device in accordance with the prior art, AA, formed from four distinct heat storage columns. These two devices were subjected to the same stresses (temperatures, fluid pressures). Table 2 and FIG. 5 illustrate the differences between the device in accordance with the invention, INV, and in accordance with the prior art, AA. FIG. 5 illustrates the thickness e (in mm) of the steel wall for each heat storage volume TES1, TES2, TES3, TES4 (TES1 being the peripheral volume and TES4 being the central volume).

TABLE 2

Comparative example

|  |  | TES 1 | TES 2 | TES 3 | TES 4 |
|---|---|---|---|---|---|
| Pressure difference experienced by steel wall (bar) | AA | 5 | 30 | 61.5 | 124.6 |
|  | INV | 5 | 25 | 31.5 | 63.1 |
| Steel thickness in accordance with CODAP (mm) | AA | 18 | 94 | 158 | 240 |
|  | INV | 18 | 78 | 80 | 111 |

It can be seen that the device in accordance with the invention can be used to substantially reduce the pressure difference experienced by the steel walls. In addition, it will be noted that the invention can be used to limit the thicknesses of the steel walls, which results in the mass and cost of the heat storage device being limited.

The invention claimed is:

1. A system for storage and recovery of energy using compressed gas, comprising heat storage volumes and delimited by concentric walls, the heat storage volumes comprising a heat storage wherein the thickness of the concentric walls delimiting the heat storage volumes decreases from a wall delimiting a central heat storage volume towards a wall delimiting a peripheral heat storage volume, compressors for compressing the gas, at least one compressed gas storage, expanders for expanding the compressed gas to generate energy, a first of the heat storage volumes being for the storage and recovery of heat for at least one of cooling the compressed gas between the compressors and heating the gas between the gas expanders, and a second heat storage volume for storage and recovery of heat in an interior of the first heat storage volume for at least one of cooling the compressed gas between one of the gas compressors and the compressed gas storage and heating the compressed gas between one of the compressed gas storages and one of the gas expanders.

2. The system as claimed in claim 1, comprising at least three concentric heat storage volumes.

3. The system as claimed in claim 1, wherein the concentric walls are metallic.

4. The system as claimed in claim 1, wherein the concentric walls are steel.

5. The system as claimed in claim 3, wherein the walls comprise an assembly of at least one welded single-layer or a multi-layered sheet metal coil.

6. The system as claimed in claim 3, wherein the walls are reinforced with at least one circumferential ring.

7. The system as claimed in claim 1, wherein a wall delimiting the heat storage volume located at a periphery of the device for storage and restitution of heat is insulated.

8. The system as claimed in claim 1, wherein the heat storage material comprises concrete beads.

9. The system as claimed in claim 1, comprising at least one of a bar and a reinforcing plate disposed between the walls.

10. The system as claimed in claim 1, comprising at least three gas compressors, at least three gas expanders, and at least three heat storage volumes.

11. A process for storage and recovery of energy using compressed gas heat storage volumes delimited by concentric walls, wherein a thickness of the concentric walls delimits the heat storage volumes and decreases from a wall delimiting a central heat storage volume towards a wall which delimits a peripheral heat storage volume, gas compressors for producing compressed gas, at least one compressed gas storage, expanders for expanding the compressed gas to generate energy, the first heat storage volume being for the storage and recovery of heat for at least one of cooling the compressed gas between the gas compressors and heating the gas between the gas expanders, and the second heat storage volume being for the storage and recovery of heat in an interior of the first heat storage volume for at least one of cooling the compressed gas between one of the gas compressors and the at least one compressed gas storage and heating the compressed gas between one of the compressed gas storages and one of the gas expanders, comprising;
 a) compressing a gas;
 b) cooling the compressed gas in the first heat storage volume to produce cooled compressed gas;
 c) compressing the cooled compressed gas;
 d) cooling the cooled compressed gas in the second heat storage volume with the second heat storage volume being located in an interior of the first heat storage volume;
 e) storing the cooled gas;
 f) heating the stored gas in the second heat storage volume;
 g) expanding the heated gas in the second heat storage volume to generate energy;
 h) heating the expanded gas in the first heat storage volume; and
 i) expanding the heated gas in the first heat storage to generate energy.

12. The process as claimed in claim 11, in which at least one of steps c) and d) and h) and i) are repeated for at least one of the gas compressors and each gas expander.

* * * * *